Oct. 16, 1962
W. E. ELFORD ETAL
3,058,792
TRUNK PISTON ENGINES
Filed Dec. 18, 1959
2 Sheets-Sheet 1
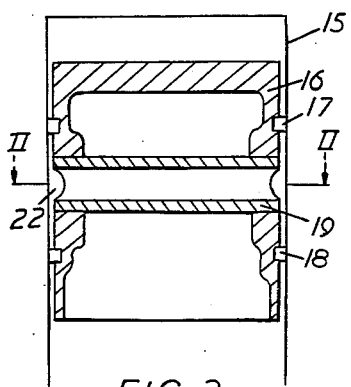
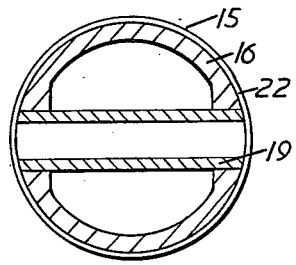
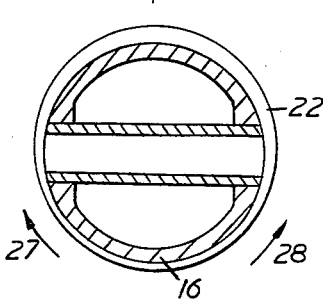
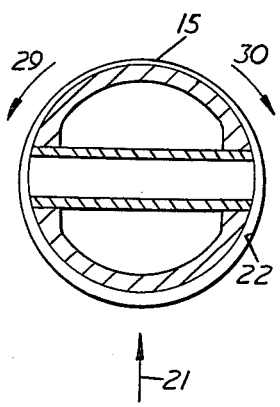
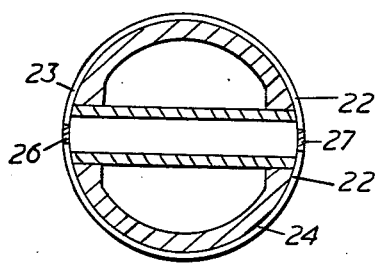
Inventors
WILLIAM EDWIN ELFORD
WILLIAM FEARON
Lawson and Taylor
By
Attorney Oct. 16, 1962  W. E. ELFORD ETAL  3,058,792
TRUNK PISTON ENGINES Filed Dec. 18, 1959  2 Sheets-Sheet 2

*Inventors*
WILLIAM EDWIN ELFORD
WILLIAM FEARON

*Attorney*

United States Patent Office //
3,058,792
Patented Oct. 16, 1962

3,058,792
TRUNK PISTON ENGINES
William Edwin Elford, Worcester Park, Surrey, and William Fearon, Esher, Surrey, England, assignors to National Research Development Corporation, London, England, a British corporation
Filed Dec. 18, 1959, Ser. No. 860,539
14 Claims. (Cl. 309—7)

The present invention relates to trunk piston engines. These, which include all devices in which a piston reciprocates within a cylinder at substantial speed, whether by external driving of the crankshaft (as in a compressor) or by combustion explosions within the cylinder (as in an I.C. engine), and in particular high speed light weight diesel compression ignition engines, are liable to suffer damage as a result of inertia forces causing high intensity transverse thrust of the piston against the cylinder liner. It is the object of the present invention to provide means for damping transverse movements of the piston in its cylinder and so to eliminate their undesirable effects.

In accordance with the present invention in its broadest aspect we provide in a trunk piston engine wherein a piston reciprocating within a cylinder is subject to forces urging it during reciprocation transversely against the cylinder, means for damping sudden transverse movement of the piston comprising means for confining and maintaining a fluid in an annular clearance space between the piston and the cylinder in sufficient amount and for sufficient time to enable such fluid to effect viscous damping of such movement.

Further, in accordance with the invention a trunk piston engine wherein a piston reciprocating within a cylinder is subject to forces urging it during reciprocation transversely against the cylinder is provided with means for damping sudden transverse movement of the piston comprising piston rings above and below the piston gudgeon pin and serving, as the piston reciprocates, to entrap and retain lubricating fluid between the rings to act as an effective cushion against sudden transverse movement of the piston. In a trunk piston engine as just described there may also be provided division members adjacent the piston gudgeon pin ends and extending between the piston rings so as to divide the annular clearance space into arcuate portions and to prevent fluid in one portion from passing freely to the other portion, and so to make it available as a viscous damper of transverse piston movement. In any of the three constructions just mentioned we may arrange means by which a supply of lubricating fluid is delivered to the annular clearance space between the rings (e.g. through channels in the connecting rod and in the gudgeon pin) in quantity sufficient to serve as a viscous damper of transverse piston movement.

The need for the present invention as outlined above has become apparent as the result of experience and experiment carried out in relation to high speed diesel engines. In these engines the problem of waterside attack of the engine liners has become acute. The attack, which takes the form of deep erosion pitting on the waterside of the liner in areas impacted by the piston, is the direct result of cavitation erosion induced by vibrations of the liner. In some instances the erosion manifests itself to a lesser degree on the main engine casting or frame, the affected areas being opposite to, and across the water jacket from the main attack area on the liner. Briefly, the mechanism of the attack is that the liner vibrations result in the formation of zones of low pressure of momentary duration on the water-cylinder liner interface, permitting the formation of cavitation bubbles. Increase in pressure causes these bubbles to collapse resulting in liner pitting damage, characteristic of cavitation erosion. With the advent of higher speed diesel engines incorporating wet liners and designed with increased power to weight ratios, the general result has been an increase in liner vibrations with corresponding increase in the severity of the cavitation erosion attack. In fact, in extreme cases the period between major overhauls of the engines is determined by the need to replace pitted liners after a period of running so short as to be uneconomic.

Research work, undertaken with the object of obtaining a clearer understanding of the basic reasons for the phenomena, has revealed that inertia forces within the engine, resulting in high magnitude fluctuating transverse forces acting on the piston through the medium of the gudgeon pin, provide the excitation for these liner vibrations. A finite working clearance exists between the piston and the engine liner and the effect of the rapid build-up of transverse forces on the piston, is to urge the piston against the wall of the liner. When the transverse force changes direction and builds up to a high value in this new direction, the piston experiences a transverse acceleration and acquires a transverse momentum, the peak magnitude of which is determined by the mass of the piston together with the terminal transverse velocity it acquires whilst it is being accelerated through the clearance distance under the influence of the transverse force. The change of transverse momentum experienced by the piston on impact with the cylinder liner, results in vibration of the liner, and if this vibration is of sufficient magnitude, cavitation is induced on the waterside of the liner with the associated cavitation erosion producing the characteristic cavitation pitting.

Recent experimental work on a particular engine yielded reliable records of liner disturbances, and an associated analysis of the transverse forces acting on the piston confirmed that the liner disturbances were the direct outcome of the fluctuating transverse forces on the piston.

The problem just outlined therefore resolves itself into the question of providing a means of damping, to ensure that the liner vibrations, resulting from the impact of the piston on the liner, are kept below the cavitation threshold. The lubrication of high speed pistons is generally dependent on splash, and scraper rings are fitted to control the oil leakage into the combustion space. Whilst the lubrication of the piston below the bottom scraper ring is probably hydrodynamic, the upper part of the piston in the neighbourhood of the compression rings probably experiences lubrication of a boundary nature. The character of the lubrication in the intermediate zone is uncertain but the damping effect of any oil which may be in the clearance space between the piston and the liner, when the piston commences its transverse movement, will be of small order since the radial side clearances existing between piston and liner provide too low hydraulic resistance path for the small volume of oil available for transfer from one side of the piston to the other.

Clearly, if the clearance volume between the piston and the liner can be kept filled with oil and if means of confining this oil can be provided during the phase when the piston experiences a reversal of transverse forces, the resulting viscous damping will reduce the severity of the impulse which the liner experiences from the transverse forces acting on the piston.

In order that the invention may be fully understood certain embodiments thereof will now be described with reference to the drawings in which:

FIGURE 1 is a diagrammatic cross sectional view of a cylinder and piston;

FIGURE 2 is a sectional view taken along the line II—II of FIGURE 1;

FIGURES 3 and 4 are views similar to FIGURE 2 but showing transverse displacement of the piston to extreme positions in either direction;

FIGURE 5 is a view similar to FIGURE 2 showing division members in accordance with the present invention;

Figure 6:
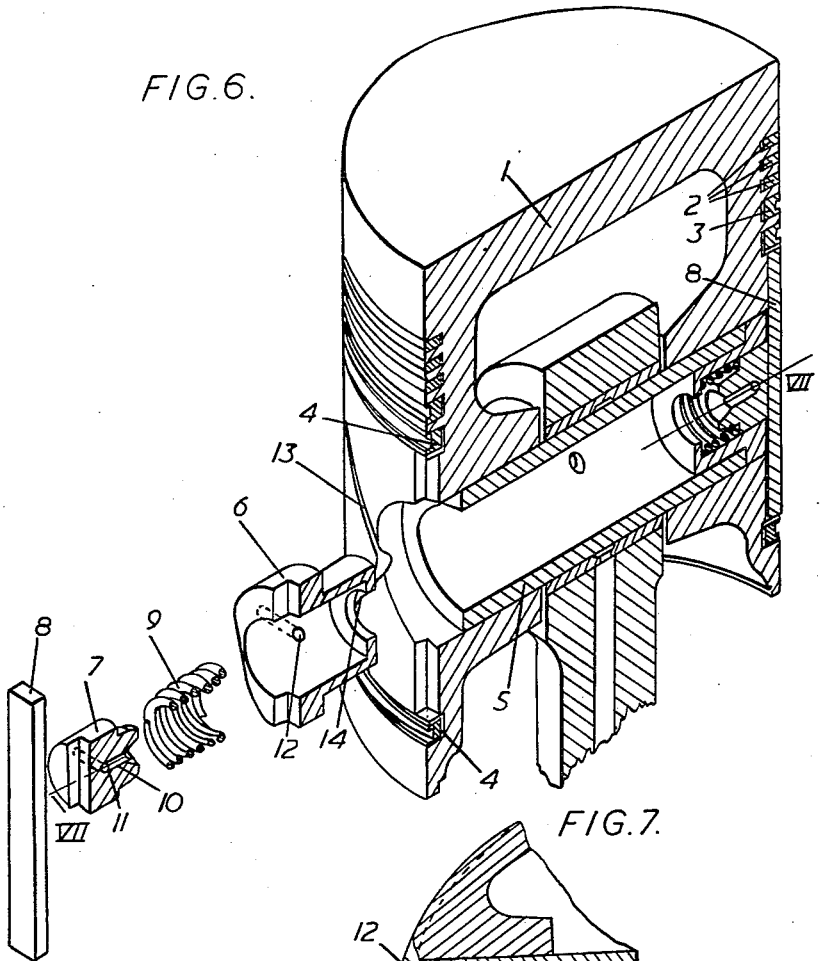
FIGURE 6 is a sectional perspective view of a piston embodying the present invention in one form.

Referring now to FIGURES 1–5, these show a cylinder 15 within which reciprocates a piston 16 having piston rings 17 and 18 arranged respectively above and below the gudgeon pin 19. When the piston reciprocates within the cylinder at high speed, the transverse thrust effect described above is experienced; this effect being alternately in the direction shown by the arrow 20 of FIGURE 3 and in the direction shown by arrow 21 in FIGURE 4. In each case the piston 16 strikes the liner of cylinder 15 with a sharp blow producing the unwanted effects described earlier herein. In accordance with the present invention such transverse movement of the piston is damped by confining in the annular clearance space 22 between piston rings 17 and 18 lubricating fluid in sufficient amount and for sufficient time to effect viscous damping of lateral piston movement. Three ways of achieving this will now be described.

In the first way the rings 17 and 18 are so formed as to entrap lubricant between them as the piston reciprocates. One way in which this may be achieved is by using a pair of taper-faced rings, each ring being tapered inwardly towards the end of the piston nearest to that ring, the effect of which is that oil can pass into the region between the rings by forcing its way past the rings but is prevented from escaping therefrom. Rings which achieve this effect are normally regarded as most unsatisfactory in piston engines. The reason for this is described in a paper entitled "An Investigation into the Mechanism of Oil Loss Past Pistons" by Dr. P. Dykes appearing in Proc. I. Mech. E., vol. 171, No. 11. In that paper is described a case in which taper-faced rings oppositely disposed are arranged so that each is able as the piston reciprocates to pass oil into the region between the rings in which a volume of oil under pressure is built up and maintained. By adopting this construction normally most disadvantageous in an I.C. engine we secure the required volume of oil to serve as a viscous damper. Care will, of course, require to be taken to prevent this oil reaching the cylinder head, and for this purpose further piston rings in the upper part of the piston will be required as shown in FIGURE 6.

The second way of achieving our aim of maintaining sufficient oil where required to minimise transverse piston movement is to divide the annular space 22 shown in FIGURES 1–5 into two arcuate portions 23, 24 as indicated in FIGURE 5. This is done by providing two division members 26, 27 extending between piston rings 17, 18 and has the effect of preventing the free passage of oil in the direction of arrows 27, 28 in FIGURE 3 or that of arrows 29, 30 in FIGURE 4.

The third method of ensuring a plentiful supply of lubricating fluid to provide viscous damping is to provide a positive pressure feed of oil to the space 22 through the connecting rod and gudgeon pin, and this is more fully explained with reference to FIGURES 6 and 7. In these figures the piston 1 is provided with three normal compression rings 2 immediately below which is fitted a conventional scraper ring 3. The two rings 4 are oil seal rings consisting of taper-faced rings having a staggered joint, each ring being tapered inwardly towards the end of the piston nearest to that ring so as to entrap and retain oil in the region between the rings.

The hollow gudgeon pin 5 supports the member 6 which in turn provides support for member 7 which is capable of axial movement relative to member 6. Slots formed in members 6 and 7 provide a sliding location for the division members 8, which are profiled on their outer surfaces to correspond with the curvature of the cylinder liner. Member 6 is profiled on its outer surface to correspond with the curvature of the working face of the piston. The extensions of member 8 above and below member 6 are accommodated in two longitudinal slots provided in the piston wall, the slots extending to meet the grooves which locate the oil seal rings 4. Member 8 is a sliding fit in its grooves with bottom clearance to accommodate piston expansion, and its length is arranged to permit small end clearance with respect to the two oil seal rings 4. Member 9 is a spring of suitable proportions located by members 6 and 7 to provide an outward radial force on member 7 and consequently on member 8, thus ensuring that the blade member 8 is continuously pressed against the liner wall. A similar spring-loaded blade assembly is provided at the other end of the gudgeon pin, the whole arrangement being symmetrical about the centre line of the piston.

Pressure oil is fed from the hollow connecting rod by way of suitable ports in the small-end bearing and the wall of the gudgeon pin, to the hollow centre of the pin, the pin being thus filled with pressure oil. The oil feed hole 10 which is drilled coincident with the gudgeon pin axis in member 7 feeds pressure oil into the transverse hole 11 which is drilled at right angles to hole 10. Two diametrically opposite holes (one of which 12 is shown) drilled in member 6, are positioned in line with hole 10. These two holes in member 6 feed the pressure oil to the clearance space around the working faces of the piston by way of grooves 13 and 14. The outward radial force on member 7 provided by the spring 9 is supplemented by the oil pressure in the hollow gudgeon pin acting on the inner face of member 7. If desired, the radial loading could be provided by either the spring or the oil pressure. Additionally, it could be provided by a combination of both.

Figure 7:
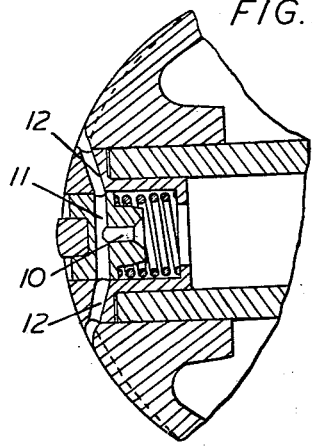
FIGURE 7 is a detail of the construction shown in FIGURE 6 taken as a section along the line VII—VII, but partly broken away.

The functioning of the arrangement shown in FIGURES 6 and 7 is as follows: The effect of the two spring and/or oil-loaded division members 8 is to divide the total annular clearance space formed between the piston and the cylinder liner, and bounded at each end by the oil seal rings 4, into two separate arcuate volumes; direct oil communication between these two volumes is confined to the two constriction passages provided by the two sets of small holes 11 and 12. When the piston is subject to lateral thrust on to one side of the liner the annular clearance volume on the non-thrust side will be full of oil (cf. FIGURE 3). When the transverse forces on the piston change direction, the piston experiences an acceleration which produces movement of the piston across the bore. This transverse movement will be resisted by the oil pressure generated in the annular space since the only transfer channel for the oil is by way of the grooves on the working face of the piston and through the constrictions provided by the hole configurations 11 and 12. The size of these constrictions must be sufficiently small to ensure high velocity flow through them, and this high velocity will require a corresponding pressure increase within the diminishing-volume annulus, to promote this high velocity flow. Further, the oil from this diminishing-volume annulus will be discharged into the increasing-volume annulus on the non-thrust side of the piston. Consequently, when the piston experiences a further reversal of transverse loading leading to lateral movement of the piston in the other direction, the movement of the piston towards the new thrust side of the cylinder liner will be resisted by a completely filled clearance annulus.

Due to the high velocity of the oil through the transfer orifices 11 the static pressure in 11 will be relatively low during the transfer phase. This will reduce the possibility of the transfer oil flowing back through the feed holes 10 against the pressure of the oil in the hollow gudgeon pin. Further, any oil which leaks past the seal rings 4 will be replaced by oil from the oil pressure feed through the oil holes 10 and this replacement will be effected intermittently when the static pressure in the transfer orifices 11 falls below the oil feed pressure.

In this way viscous damping of the transverse piston movement is achieved by generation of hydraulic pressure in the oil-filled annular clearance space between the piston and the cylinder liner. This damping reduces the terminal transverse velocity of the piston and therefore, by lessening the transverse momentum acquired by the piston, results in a corresponding reduction in the magnitude of the impulse imparted by the piston to the cylinder liner.

While we have disclosed preferred embodiments of our invention by illustrations, it is to be understood that many modifications and changes may be made in the constructional details and features without departing from the spirit and scope of the invention and we desired to be limited only by the scope of the appended claims.

What we claim is:

1. Means for effecting viscous damping of transverse movement of a piston on reciprocation of said piston within a cylinder comprising means for confining and maintaining a fluid in an annular clearance space defined by said piston and said cylinder in sufficient amount and for sufficient time to enable said fluid to effect viscous damping of such movement.

2. Means for effecting viscous damping of transverse movement of a piston according to claim 1 including a connecting rod and a gudgeon pin of said piston having channels defined therein through which said fluid is delivered to said annular clearance space.

3. Means for effecting viscous damping of transverse movement of a piston on reciprocation of said piston within a cylinder comprising a piston having a gudgeon pin therein, taper-faced piston rings fitted on said piston above and below said gudgeon pin and disposed so as to scrape fluids towards said gudgeon pin whereby fluid is confined and maintained in an annular clearance space defined by the piston, taper-faced piston rings and cylinder in sufficient amount and for sufficient time as to enable said fluid to effect viscous damping of such movement.

4. Means for effecting viscous damping of transverse movement of a piston according to claim 3 including a connecting rod having a channel defined therein, said connecting rod channel being in communication with a channel defined in said gudgeon pin so that said fluid can be delivered to said annular clearance space through said channels.

5. Means for effecting viscous damping of transverse movement of a piston on reciprocation of said piston within a cylinder comprising, a piston, a gudgeon pin, and a pair of taper-faced piston rings, said gudgeon pin being mounted and said piston and said pair of taper-faced piston rings being fitted on said piston one above and below said gudgeon pin and disposed so as to scrape fluid towards said gudgeon pin whereby fluid is confined and maintained in an annular clearance space defined by said piston and by said cylinder in sufficient amount and for sufficient time so as to enable said fluid to effect viscous damping of such movement.

6. Means for effecting viscous damping of transverse movement of a piston according to claim 5 including a connecting rod having a channel defined therein, said channel being in communication with a channel defined in said gudgeon pin of said piston.

7. Means for effecting viscous damping of transverse movement of a piston on reciprocation of said piston in a cylinder comprising a piston, taper-faced piston rings, a gudgeon pin and division members, said gudgeon pin being mounted in said piston and said taper-faced piston rings being fitted on said piston above and below said gudgeon pin and disposed so as to scrape fluid toward said gudgeon pin whereby fluid is confined and maintained in an annular clearance space defined by said piston, piston rings and cylinder in sufficient amount and for sufficient time so as to enable said fluid to effect viscous damping of said movement, and said division members being provided adjacent the ends of said gudgeon pin and extending between said taper-faced piston rings so as to divided said annular clearance space into two arcuate portions and to prevent fluid in one portion from passing freely to the other portion.

8. Means for effecting viscous damping of transverse movement of a piston according to claim 7 including a connecting rod having a channel defined therein, said channel being in communication with a channel defined in said gudgeon of said piston so as to deliver said fluid to said annular clearance space.

9. Means for effecting viscous damping of transverse movement of a piston on reciprocation of said piston within a cylinder comprising a piston, a gudgeon pin, a pair of taper-faced piston rings and division members, said piston having said gudgeon pin mounted therein and said taper-faced piston rings being fitted on said piston one above and the other below said gudgeon pin and disposed so as to scrape fluid toward said gudgeon pin whereby fluid is confined and maintained in an annular clearance space defined by said piston, piston rings and cylinder in sufficient amount and for sufficient time so as to enable said fluid to effect viscous damping of such movement, and said division members being provided adjacent the ends of said gudgeon pin and extending between said pair of taper-faced piston rings so as to divide said annular clearance space into two arcuate portions and to prevent fluid in one portion from passing freely to the other portion.

10. Means for effecting viscous damping of transverse movement of a piston according to claim 9 including a connecting rod having a channel defined therein, said channel being in communication with a channel provided in said gudgeon pin of said piston so as to deliver said fluid to said annular clearance space.

11. Means for effecting viscous damping of transverse movement of a piston according to claim 9 including at least one additional piston ring fitted to said piston between said annular clearance space and the head of said piston whereby the leakage of fluid from said annular clearance space to the head of said piston is minimized.

12. Means for effecting viscous damping of transverse movement of a piston according to claim 11 including a connecting rod having a channel defined therein, said connecting rod being in communication with a channel defined in said gudgeon pin so as to deliver to said annular clearance space said fluid.

13. Means for effecting viscous damping of transverse movement of a piston on reciprocation of said piston within a cylinder comprising a piston, a pair of taper-faced piston rings, a gudgeon pin, division members and at least one additional piston ring, said gudgeon pin being mounted in said piston, said pair of taper-faced piston rings being fitted on said piston one above and the other below said gudgeon pin and disposed so as to scrape fluid toward said gudgeon pin whereby fluid is confined and maintained in an annular clearance defined by said piston pair of taper-faced piston rings and cylinder in sufficient amount and for sufficient time so as to enable said fluid to effect viscous damping of such movement, said division members being provided adjacent the end of said gudgeon pin and extending between said pair of taper-faced piston rings so as to divide said annular clearance space into two arcuate portions and to prevent fluid in one portion from passing freely to the other portion, and at least one additional piston ring fitted to said piston between said annular clearance space and the head of said piston whereby the leakage of fluid from said annular clearance to the head of said piston is minimized.

14. Means for effecting viscous damping of transverse movement of a piston according to claim 13 including a connecting rod having a channel defined therein, said connecting rod channel being in communication with a channel defined in said gudgeon pin whereby said fluid is delivered to said annular clearance through said channels.

References Cited in the file of this patent

UNITED STATES PATENTS 2,155,455    Thoma _____ Apr. 25, 1939

FOREIGN PATENTS 615,274    Great Britain _____ Jan. 4, 1949
321,259    Switzerland _____ June 15, 1957